L. H. SOLOMON.
AUTOMATIC DRINKING FOUNTAIN.
APPLICATION FILED JUNE 19, 1919.
1,354,349.
Patented Sept. 28, 1920.
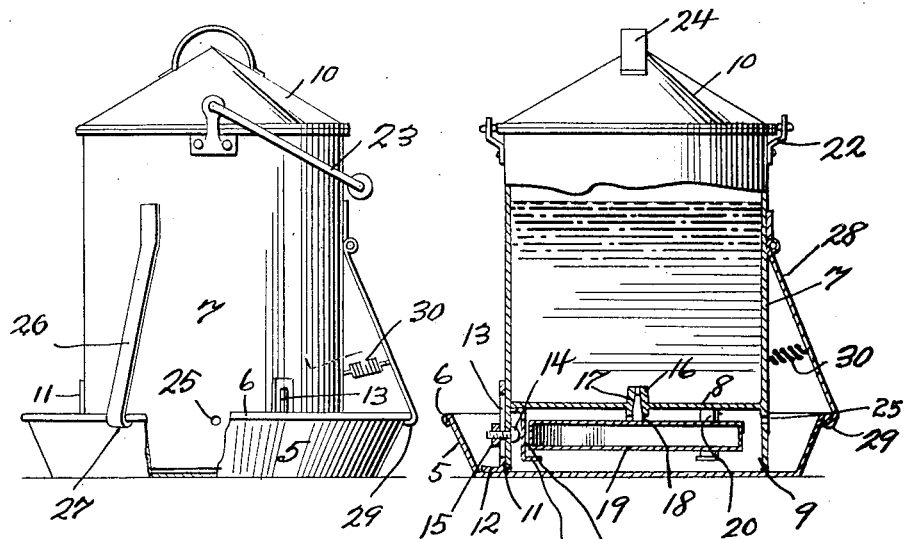
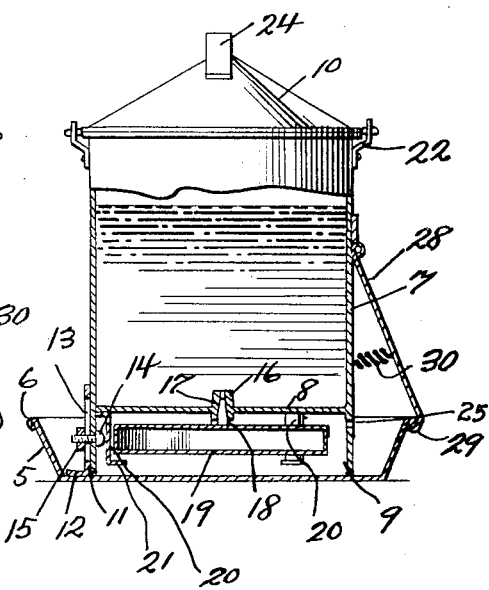
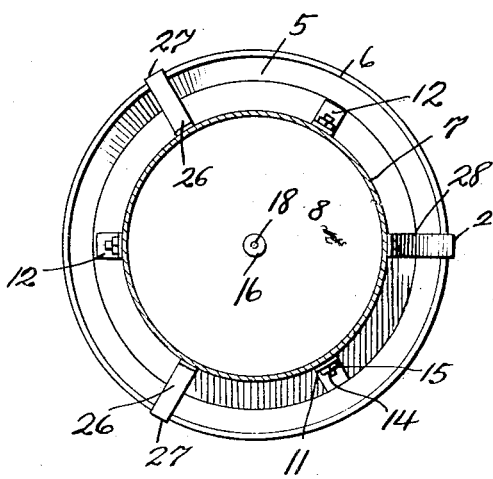
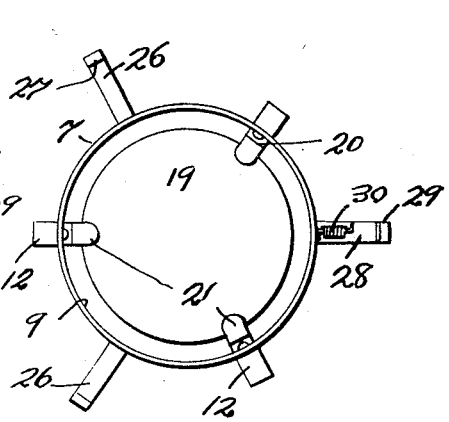
L. H. Solomon,
Inventor
By Geo. F. Kimmel
Attorney

UNITED STATES PATENT OFFICE.

LUCIUS H. SOLOMON, OF TIFFIN, OHIO.

AUTOMATIC DRINKING-FOUNTAIN.

1,354,349.   Specification of Letters Patent.   Patented Sept. 28, 1920.

Application filed June 19, 1919. Serial No. 305,445.

*To all whom it may concern:*

Be it known that I, LUCIUS H. SOLOMON, a citizen of the United States, residing at Tiffin, in the county of Seneca and State of Ohio, have invented certain new and useful Improvements in Automatic Drinking-Fountains, of which the following is a specification.

The invention relates to a drinking fountain, and more particularly to the class of automatic drinking fountains for stock, fowls or the like.

One object of the invention is the provision of a fountain of this character, wherein the pan is readily removable from the reservoir for cleaning of the pan for sanitary purposes.

A further object of the invention is the provision of a fountain of this character, wherein the float for regulating the feed of water from the reservoir to the pan is held in a novel manner so that it can be readily removed when the occasion requires.

A still further object of the invention is the provision of a fountain of this character, which is extremely simple in construction, very reliable and efficient in its purpose, strong, durable and inexpensive to manufacture.

With these and other objects in view, the invention consists of the features of construction, combination and arrangement of parts as will be hereinafter fully described, illustrated in the accompanying drawings and pointed out in the claims hereunto appended.

In the accompanying drawings:

Figure 1 is a side elevation of a drinking fountain constructed in accordance with the invention, showing a portion of the pan broken away.

Fig. 2 is a view similar to Fig. 1 showing the reservoir and pan partly in section.

Fig. 3 is a horizontal sectional view taken transversely through the reservoir above the pan.

Fig. 4 is a bottom plan view looking toward the float, the pan being removed.

Similar reference characters indicate corresponding parts throughout the several views in the drawings.

Referring to the drawings in detail 5 designates a pan which constitutes a watering trough, the same being preferably of dish shape and being formed on its side wall with an outturned annular bead 6 constituting a reinforcement to the mouth of said pan. Supported within the pan 5 is a water reservoir comprising a cylindrical body 7 having a bottom 8 spaced from the lower open end 9 thereof while the opposite or upper open end has removably fitted therein a lid or cover 10, preferably of conical shape and which is telescoped within the upper open end of said body 7. On removal of the cover or lid 10 the body 7 can be filled with water. Connected at intervals to the vertical wall of the body 7 at its lower open end are adjustable legs 11, each being formed with a foot 12 adapted to rest upon the bottom of the pan 5, the leg 11 being formed with an elongated slot 13 longitudinally therein, while engaged in the vertical wall of the body 7 is a bolt 14 which is passed through the slot 13 and carries a nut 15 and in this manner the leg 11 is adjustably fastened to the body 7 for a purpose presently described.

Formed centrally of the bottom 8 of the body is a water outlet nozzle 16 having formed therein a tapered seat 17 for accommodating a correspondingly shaped plug 18 integrally formed upon and suitably mounted on a hollow float 19, the plug 18 being centrally located upon the float which is arranged within the lower open end 9 of the body 7. Fixed to the bottom 8 of the body 7 at intervals circumferentially of the float 19 are hangers or brackets 20 which are formed at their lower ends with ears 21 bent inwardly at right angles to the brackets or hangers 20 and constituting stops for limiting the lowering movement of the float 19 in the open end 9 of the body 7 below the bottom 8 thereof.

Secured to the body 7 near the upper open end thereof at diametrically opposite points are bail ears 22 in which are loosely engaged a loop bail 23 constituting a handle for the said body. The cover or lid 10 is also provided with a loop handle 24 to permit the easy removal of the lid or cover from the body 7 as will be clearly apparent.

The body 7 below the bottom 8 thereof is formed with air vents 25 so as to permit the convenient filling of the pan 5 with water from the reservoir.

The body 7 is elevated the proper distance from the bottom of a pan 5 by adjusting the legs 11 so that the lower edge of the body 7 will be spaced a proper distance from the bottom of the pan to permit the flow of water from the reservoir into the pan, the water being automatically controlled through the medium of the float 19 which is adapted to automatically rise with the water in the pan 5 and when the water has reached a predetermined level in said pan the plug 18 engages the seat 17 in the nozzle 16 thereby shutting off the flow of water from the reservoir to the pan.

Secured interiorly to the body 7 at one side of the center of the same and the desired distance apart are resilient keepers 26, each being formed with a hook-shaped free end 27 which is adapted to engage the bead 6 on the edge of the pan 5, while on the opposite side of the center of the body 7 and secured exteriorly thereto is a hinged catch 28 which is also formed with a hook-shaped free end 29 to engage the bead 6 of the pan 5 and in this manner the said pan is removably fastened to the reservoir. Connected to the body 7 and also to the catch 28 is a coiled retractile spring 30 which holds the catch in position to engage with the bead 6 on the pan 5, yet permitting the said catch 28 to be disengaged from the bead 6 when it is desired to remove the pan to permit the cleaning thereof.

It will be apparent that the ears 21 can be bent downwardly and outwardly to permit the removal of the float 19 when the occasion requires.

From the foregoing it is thought that the construction and manner of operation of the drinking fountain will be clearly understood therefore a more extended explanation has been omitted.

What is claimed is:

1. A drinking fountain, the combination with a pan having a beaded edge constituting a trough and a receptacle supported thereby, of a plurality of elongated angularly extending spring keepers permanently affixed to the receptacle, hooks on the keepers for engaging about the beaded edge of the trough for retaining the receptacle therein, and a hinged elongated angularly extending keeper mounted on the receptacle and engaging the trough for releasably retaining the receptacle therein, and a coil spring for normally holding the hinged keeper in a retaining position relative the receptacle and the trough.

2. A drinking fountain, the combination with a pan constituting a trough, of a tank supported by the pan, a partition formed integrally within the tank dividing the same into a water compartment and a valve compartment, the water compartment being of greater depth but of the same width as the valve compartment, a nozzle integrally formed in the partition and extending above and below the upper and lower surfaces thereof, brackets carried upon the lower face of the partition, inwardly extending ears on the brackets, a float arranged between the brackets and limited in downward movement by the ears thereof, a plug on the float of greater length than the distance of the downward movement permitted the float by the ears engaging the nozzle at all times to limit the flow of water from the water compartment to the trough, and means for maintaining the tank in the trough.

In testimony whereof I affix my signature hereto.

LUCIUS H. SOLOMON.